United States Patent
Jang

(10) Patent No.: US 11,082,614 B2
(45) Date of Patent: Aug. 3, 2021

(54) DISPLAY APPARATUS CONFIGURED TO DISPLAY AN IMAGE HARMONIZED WITH AN INSTALLATION SPACE, AND AN ASSOCIATED SYSTEM AND RECORDING MEDIUM

(71) Applicant: SAMSUNG ELECTRONICS CO., LTD., Suwon-si (KR)

(72) Inventor: Sung-chang Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/462,736

(22) PCT Filed: Nov. 16, 2017

(86) PCT No.: PCT/KR2017/012988
§ 371 (c)(1),
(2) Date: May 21, 2019

(87) PCT Pub. No.: WO2018/093160
PCT Pub. Date: May 24, 2018

(65) Prior Publication Data
US 2020/0068122 A1    Feb. 27, 2020

(30) Foreign Application Priority Data
Nov. 21, 2016   (KR) ........................ 10-2016-0155204

(51) Int. Cl.
*H04N 5/232*   (2006.01)
*H04N 9/73*    (2006.01)
(Continued)

(52) U.S. Cl.
CPC .......... *H04N 5/23229* (2013.01); *G06T 7/90* (2017.01); *H04N 5/23222* (2013.01);
(Continued)

(58) Field of Classification Search
CPC ........ H04N 5/23229; H04N 9/73; H04N 5/58; H04N 5/2628; H04N 5/23222;
(Continued)

(56) References Cited

U.S. PATENT DOCUMENTS

| | | |
|---|---|---|
| 9,390,558 B2 | 7/2016 | O'Brien |
| 2008/0310675 A1 | 12/2008 | O'Brien |

(Continued)

FOREIGN PATENT DOCUMENTS

| | | |
|---|---|---|
| CN | 203027366 U | 6/2013 |
| CN | 104639748 A | 5/2015 |

(Continued)

OTHER PUBLICATIONS

International Search Report dated May 18, 2018, issued by the International Searching Authority in International Application No. PCT/KR2017/012988 (PCT/ISA/210).

*Primary Examiner* — Padma Haliyur
(74) *Attorney, Agent, or Firm* — Sughrue Mion, PLLC

(57) ABSTRACT

Disclosed is a display apparatus including: a display; a communicator configured to communicate with an external apparatus; and a processor configured to receive a first image and a second image from the external apparatus
(Continued)

through the communicator, identify a region corresponding to the display within the first image, extract an image corresponding to the identified region from the second image, and process the extracted image to be displayed on the display.

14 Claims, 14 Drawing Sheets

(51) Int. Cl.
  *G06T 7/90* (2017.01)
  *H04N 5/262* (2006.01)
  *H04N 5/58* (2006.01)
(52) U.S. Cl.
  CPC ..... *H04N 5/232945* (2018.08); *H04N 5/2628* (2013.01); *H04N 5/58* (2013.01); *H04N 9/73* (2013.01)
(58) Field of Classification Search
  CPC ....... H04N 5/232945; G06T 7/90; G06T 5/50; G06T 7/254; G06T 5/005; G06T 2207/20132; G06T 2207/30121; G06T 2207/20221; G09G 3/20; G06F 3/14
  See application file for complete search history.

(56) References Cited

U.S. PATENT DOCUMENTS

| | | | | |
|---|---|---|---|---|
| 2012/0013646 | A1* | 1/2012 | Ichioka | H04N 5/44 345/690 |
| 2015/0260505 | A1* | 9/2015 | Nagano | G06T 7/73 348/135 |
| 2016/0180577 | A1* | 6/2016 | Jang | H04N 13/302 345/419 |

FOREIGN PATENT DOCUMENTS

| | | |
|---|---|---|
| JP | 2006-189708 A | 7/2006 |
| KR | 10-2006-0030193 A | 4/2006 |
| KR | 10-2009-0075234 A | 7/2009 |
| KR | 10-2011-0055090 A | 5/2011 |
| KR | 10-2012-0050616 A | 5/2012 |
| KR | 10-2015-0099880 A | 9/2015 |
| KR | 10-2015-0138898 A | 12/2015 |
| KR | 10-2016-0027384 A | 3/2016 |

* cited by examiner

FIG. 4
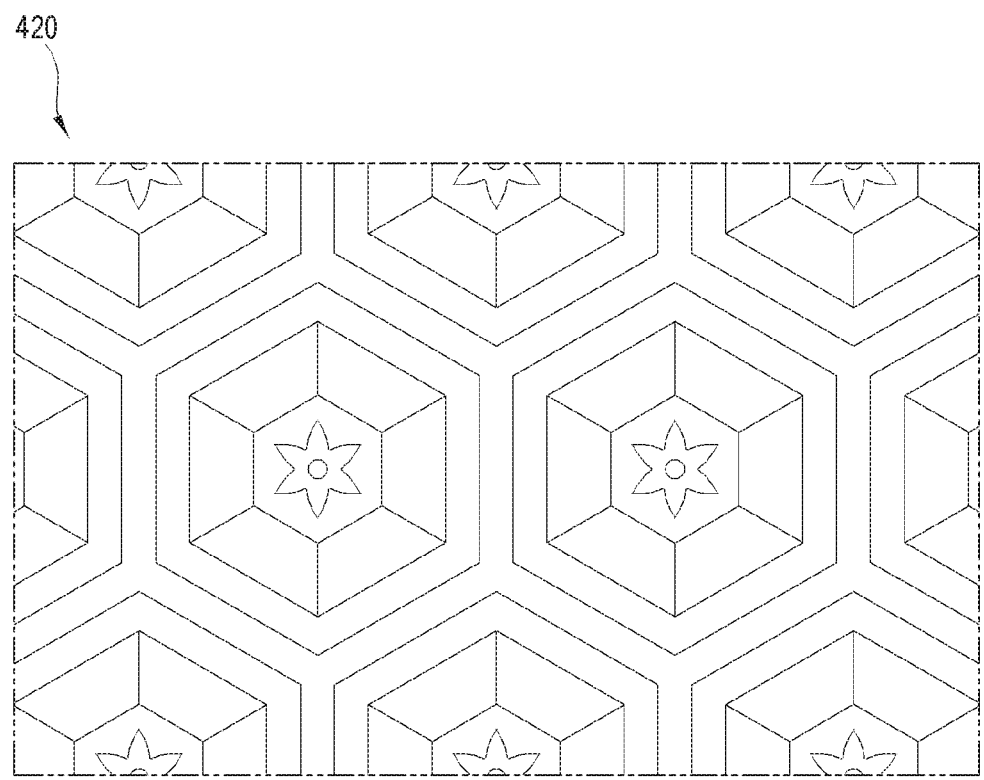
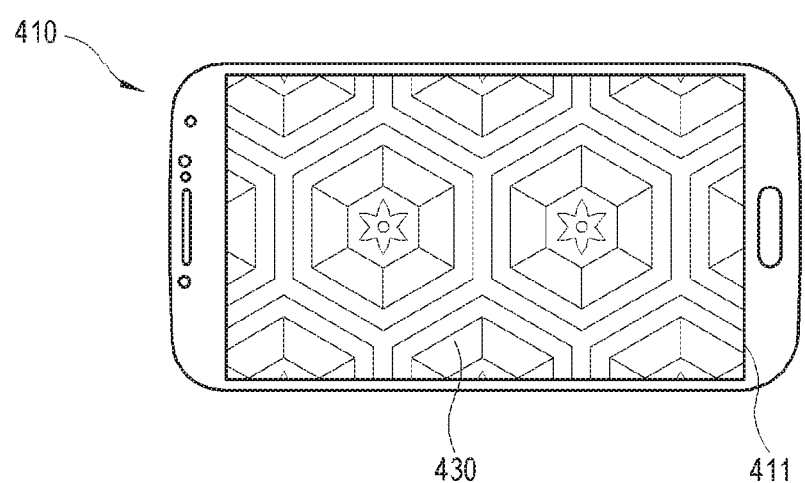

FIG. 5
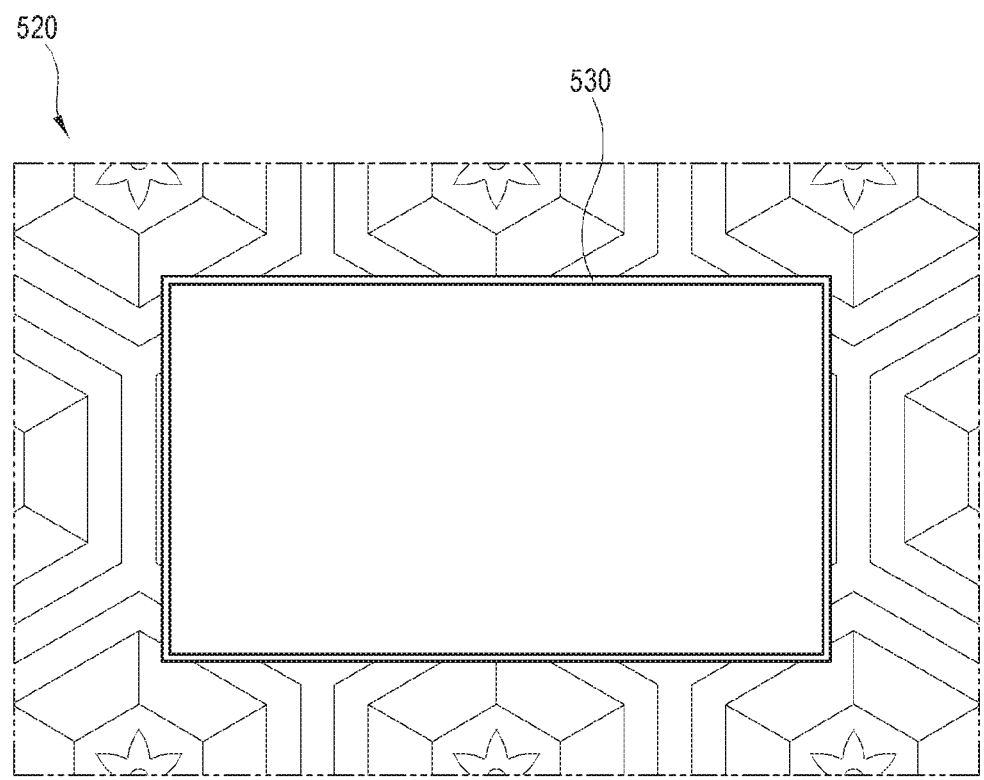
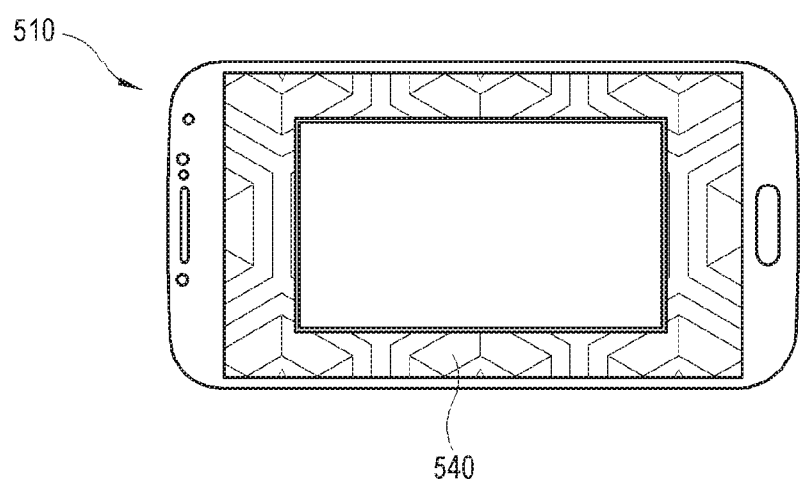

DISPLAY APPARATUS CONFIGURED TO DISPLAY AN IMAGE HARMONIZED WITH AN INSTALLATION SPACE, AND AN ASSOCIATED SYSTEM AND RECORDING MEDIUM

TECHNICAL FIELD

The disclosure relates to a display apparatus for displaying an image on a screen, a system, and a recording medium, and more particularly to a display apparatus having an improved structure of a use environment by making a screen of the display apparatus harmonize with a background of an environment where the display apparatus is installed, a system, and a recording medium.

BACKGROUND ART

To calculate and process predetermined information according to a specific process, an electronic apparatus basically including electronic parts such as a central processing unit (CPU) for calculation, a chipset, a memory, and the like may be classified into various types depending on what is the information to be subjected to the process. For example, the electronic apparatus is classified into an information processing apparatus such as a personal computer (PC), a server, and the like to process universal information, and an image processing apparatus to process image information.

The image processing apparatus receives a content signal including image data from the outside, and processes the image data extracted from the content signal in accordance with various image processing processes. The image processing apparatus displays an image based on the processed image data on its own display, or outputs the processed image data to another apparatus having a display so that the corresponding apparatus can display the image.

The image processing apparatus having the display is in particular called a display apparatus, and for example includes a TV, a monitor, a portable multimedia player, a tablet computer, a mobile phone, etc.

In the display apparatus stationarily installed and used like a TV, an available screen of the display has increased in size with development of technology. Further, the large size of the available screen has made many display apparatuses be mounted to a wall rather than used with a stand. However, the screen of the display apparatus is generally black while displaying no content images.

Such a large black region occupying the middle of the wall may cause a user to feel uneasy. Further, a user may feel foreignness in terms of interior decoration because the screen of the display apparatus interrupts the pattern of the wallpaper. In those days most of display apparatuses had a relatively small display and were used with a stand, and therefore such problems were not serious. On the other hand, in these days many display apparatuses have a relatively large display and are mounted to a wall, and therefore the problems have become highlighted. Accordingly, it may be required to apply a structure or method for overcoming the problems and improving a use environment to the display apparatus.

DISCLOSURE

Technical Solution

A display apparatus includes: a display; a communicator configured to communicate with an external apparatus; and a processor configured to receive a first image and a second image from the external apparatus through the communicator, identify a region corresponding to the display within the first image, extract an image corresponding to the identified region from the second image, and process the extracted image to be displayed on the display. Thus, the display apparatus displays an image harmonizing with an installation space instead the display looking a large black region, thereby providing a use environment improved in interior decoration.

Here, the processor may identify the first image obtained by capturing an installation space in which the display apparatus is installed, and the second image obtained by capturing the installation space in which the display apparatus is not installed.

Further, the processor may identify a region, in which a solid color is continued more largely than a preset area, within the first image as a region corresponding to the display. Thus, the display apparatus may easily identify the region corresponding to the display within the first image.

Further, the processor adjusts at least one of a display scale and a display position of the extracted image to be displayed so that an edge of the extracted image can match an edge of an installation space of the display apparatus. Thus, the display apparatus makes the outline of the displayed image harmonize with the image of the installation space, thereby making a user feel as if the installation space is continued.

Further, the display apparatus may further include a first sensor configured to detect an optical characteristic of a surrounding environment around the display apparatus, wherein the processor adjusts an image characteristic of the extracted image in accordance with the optical characteristic detected by the first sensor. Thus, the display apparatus makes the image characteristic of the displayed image harmonize with the image of the installation space, thereby making a user feel as if the installation space is continued.

Here, the first sensor may include an illumination sensor, and the processor may adjust brightness of the extracted image in accordance with brightness detected by the illumination sensor.

Further, the first sensor may include a color level sensor, and the processor may adjust a white balance level of the extracted image in accordance with a color level of the surrounding environment detected by the color level sensor.

Further, the display apparatus may further include a second sensor configured to detect whether a user is absent or present, wherein the processor displays the extracted image on the display based on detected presence of a user, but does not display the extracted image on the display based on detected absence of a user. Thus, the display apparatus does not display the image unnecessarily while a user is absent, thereby preventing energy from being wastefully consumed.

Further, the processor may allow the extracted image to be displayed while the display apparatus is in a standby mode.

Further, in a nonvolatile recording medium recording a program code of a method executable by a processor of a display apparatus, the method including: receiving a first image and a second image; identifying a region corresponding to a display of the display apparatus within the first image; extracting an image corresponding to the identified region from the second image; and displaying the extracted image on the display.

Here, the recording medium may further include identifying the first image obtained by capturing an installation space in which the display apparatus is installed, and the second image obtained by capturing the installation space in which the display apparatus is not installed.

Further, the identifying may include identifying a region, in which a solid color is continued more largely than a preset area, within the first image as a region corresponding to the display.

Further, the displaying may include adjusting at least one of a display scale and a display position of the extracted image to be displayed so that an edge of the extracted image can match an edge of an installation space of the display apparatus.

Further, the recording medium may further include detecting an optical characteristic of a surrounding environment around the display apparatus; and adjusting an image characteristic of the extracted image in accordance with the optical characteristic detected by the first sensor.

Here, the detecting may include detecting brightness of the surrounding environment by an illumination sensor, and the adjusting may include adjusting the brightness of the extracted image in accordance with the brightness detected by the illumination sensor.

Further, the detecting may include detecting a color level of the surrounding environment by a color level sensor, and the adjusting may include adjusting a white balance level of the extracted image in accordance with a color level of the surrounding environment sensed by the color level sensor.

Further, the recording medium may further include detecting whether a user is absent or present; and displaying the extracted image on the display based on detected presence of a user, but displaying no extracted image on the display based on detected absence of a user.

Further, the recording medium may further include allowing the extracted image to be displayed while the display apparatus is in a standby mode.

Further, a system according to an embodiment of the disclosure includes a display apparatus; and an external apparatus communicating with the display apparatus, the external apparatus including: a camera; and a controller configured to identify a region corresponding to a display of the display apparatus within a first image based on the first image and a second image being captured by the camera, extract an image corresponding to the identified region from the second image, and transmit the extracted image to the display apparatus, and the display apparatus including: the display; and a processor configured to process the extracted image received from the external apparatus to be displayed on the display.

Here, the external apparatus may further include an external apparatus display, and a sensor configured to detect a distance from the external apparatus to an installation space in which the display apparatus is installed, and the controller may display an outline of the installation space captured by the camera on the external apparatus display, and displays a preset guide image on the external apparatus display based on the distance detected by the sensor as a preset value.

DESCRIPTION OF DRAWINGS

FIG. 4 illustrates that an external apparatus according to an embodiment of the disclosure captures an image of an installation space in which a display apparatus is not installed.

FIG. 5 illustrates that an external apparatus according to an embodiment of the disclosure captures an image of an installation space in which a display apparatus is installed.

BEST MODE

Below, embodiments of the disclosure will be described in detail with reference to accompanying drawings. In the following descriptions of the embodiments, the matters illustrated in the accompanying drawings will be referred. Further, the embodiments described with reference to the accompanying drawings are not exclusive to each other unless otherwise mentioned, and a plurality of embodiments may be selectively combined within one apparatus. The combination of these embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Figure 1:
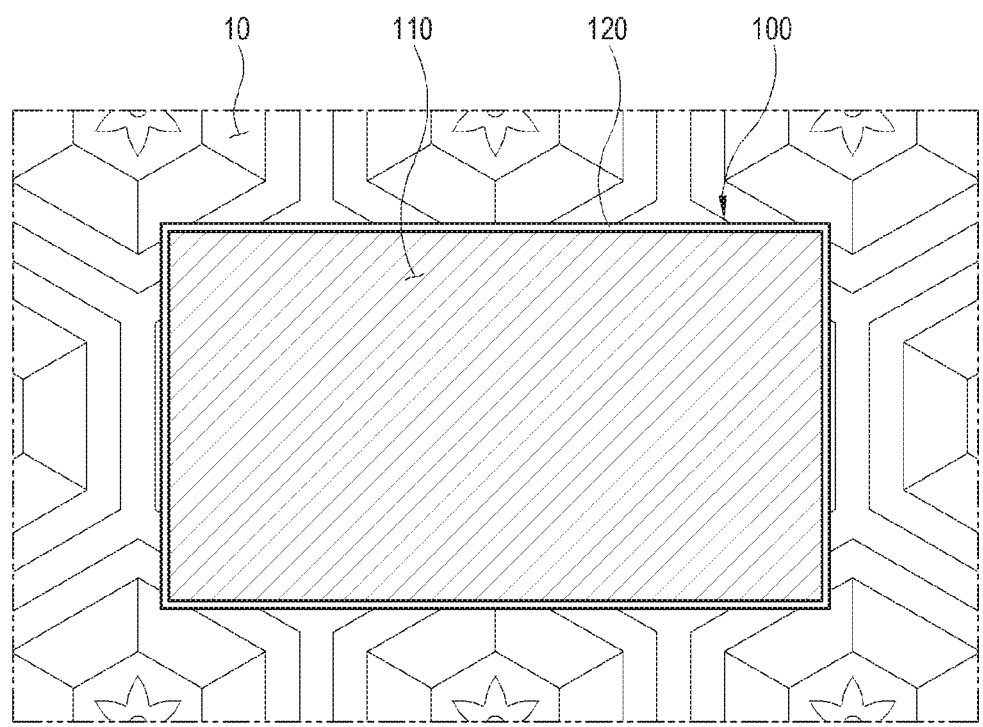
FIG. 1 illustrates that a display apparatus according to an embodiment of the disclosure is supported on an installation space.

FIG. 1 illustrates that a display apparatus according to an embodiment of the disclosure is supported on an installation space.

As shown in FIG. 1, a display apparatus 100 according to an embodiment of the disclosure may be stationarily installed on a predetermined installation space 10. The display apparatus 100 may be broadly classified into a type of being used as stationarily installed at a certain position and a type of being used as carried by a user. The display apparatus 100 according to an embodiment of the disclosure corresponds to the type of being used as installed at a certain position like a TV. There are various methods of installing the display apparatus 100. For example, the display apparatus 100 may be installed as its bottom of a main body is supported with a stand, or may be installed as supported on the installation space 10. The concept of the disclosure may be applied to both types as described above.

The display apparatus 100 includes a display 110 having an available display screen for displaying an image thereon, and a bezel 120 for supporting the edges of the display 110 in four directions. When a user views the display apparatus 100 supported on the installation space 10 in front of the display apparatus 100, it looks that the display 110 is surrounded with the bezel 120 and the installation space 10 is present around the bezel 120.

According to the related art, the available display screen of the display 110 is uniformly black while the display apparatus 100 display a content image, for example, while system power is not supplied to the display apparatus 100 or in a standby mode of the display apparatus 100. However, the display 120 nowadays tends to have a large screen 110, and therefore such a large black screen on the installation space 10 may cause many problems such as foreignness, incompatibility, and uneasiness a user feels about the black screen, etc. in aesthetic and interior decorative points of view.

The installation space 10 has a predetermined repetitive image pattern or an irregular image. Although the display apparatus 100 displays a predetermined image on the display 110 to avoid the black screen in a standby mode, the displayed image may still make a user feel the foreignness against the installation space 10 having a predetermined image.

Accordingly, an embodiment of the disclosure proposes a method of displaying an image with less foreignness against the image of the installation space 10 around the display apparatus 100 when the display apparatus 100 is in the standby mode, and detailed descriptions about this embodiment will be made later.

Below, a system including the display apparatus 100 according to an embodiment of the disclosure will be described later.

Figure 2:
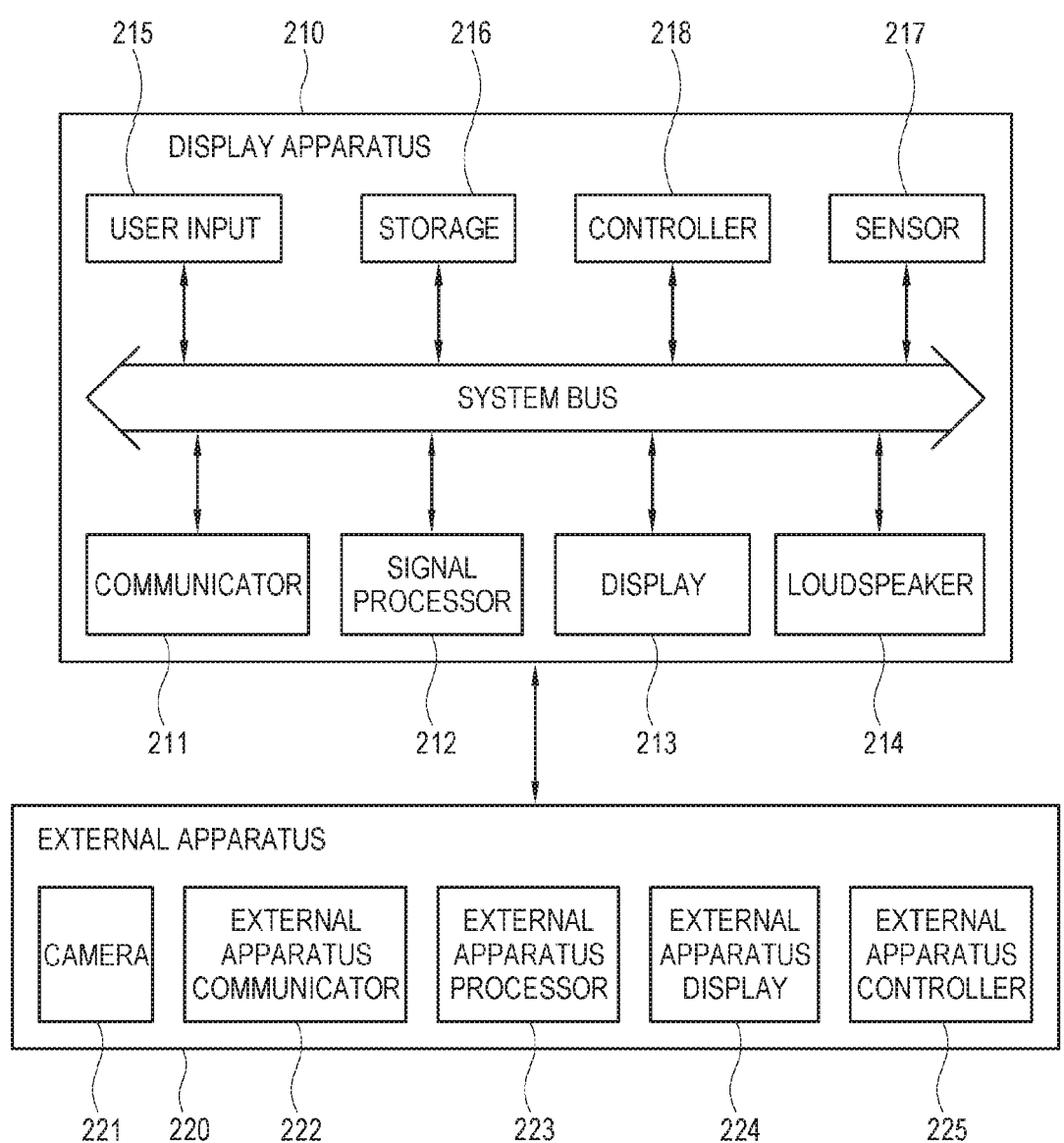
FIG. 2 is a block diagram of a system according to an embodiment of the disclosure.

FIG. 2 is a block diagram of a system according to an embodiment of the disclosure.

As shown in FIG. 2, the system according to an embodiment of the disclosure includes a display apparatus 210 supported on a predetermined installation space and displaying an image, and an external apparatus 220 communicating with the display apparatus 210. The display apparatus 210 and the external apparatus 220 may communicate with each other by a wire or wirelessly. For example, the wired communication may be achieved by directly connecting a cable between the display apparatus 210 and the external apparatus 220. The wireless communication may be achieved by direct communication based on Wi-Fi direct, Bluetooth, etc. between the display apparatus 210 and the external apparatus 220 or indirect communication based on Wi-Fi using a separate hub or access point (AP) between the display apparatus 210 and the external apparatus 220.

The display apparatus 210 may for example be actualized by a TV. According to an embodiment of the disclosure, the installation environment of the display apparatus 210 is the same as described above in FIG. 1.

The external apparatus 220 refers to an apparatus that includes a camera 221 and provides an image captured by the camera 221 to the display apparatus 210, and there are no limits to the kind of external apparatuses 220. For example, the external apparatus 220 may include a digital camera supporting the wireless communication, a mobile apparatus including the camera 221, etc.

Below, the configuration of the display apparatus 210 will be described.

The display apparatus 210 includes a communicator 211 communicating with the external apparatus 220 or the like various devices or content sources, a signal processor 212 processing a content signal received through the communicator 211, a display 213 displaying an image based on video data of the content signal processed by the signal processor 212, a loudspeaker 214 outputting a sound based on audio data of the content signal processed by the signal processor 212, a user input 215 performing input operation by a user, a storage 216 storing data, a sensor 217 detecting optical characteristics of surrounding environments, and a controller 218 performing calculation for process of the signal processor 212 and control for operation of the display apparatus 210. These elements are connected to one another through a system bus.

The communicator 211 refers to a communication module corresponding to each of various communication protocols or a data input interface where ports or the like are combined, and includes a communication chipset or a communication circuit. The communicator 211 basically refers to an element for receiving a signal or data from the outside, but is not limited thereto. Alternatively, the communicator 211 may perform interactive communication. The communicator 211 may for example include at least one of elements such as a tuning chip to be tuned to a selected frequency for a radio frequency (RF) broadcast signal, an Ethernet module receiving packet data from the Internet through a wire, a wireless communication module receiving packet data wirelessly, and a connection port to which an external memory such as a universal serial bus (USB) memory is connected.

The signal processor 212 processes the content signal received in the communicator 211 so that content can be reproduced. The signal processor 212 performs process so that the display 213 can display a content image and the loudspeaker 214 can output a content sound. The signal processor 212 includes a hardware processor, actualized as a chipset, a buffer, a circuit, etc., mounted on a printed circuit board, and may also be actualized by a system on chip (SOC).

The signal processor 212 includes modules corresponding to various processes, such as a demultiplexer, a decoder, a scaler, an audio digital signal processor (DSP), an amplifier, etc., some of which may be actualized by an SOC. For example, the demultiplexer, the decoder, the scaler, and the like module for video processing may be actualized by an image processing SOC, and the audio DSP may be actualized by a separate chipset.

The display 213 displays an image based on an image signal on an available display screen, and includes a display panel having a light receiving structure such as a liquid crystal display (LCD) or a self-emissive structure such as an organic light emitting diode (OLED). Further, the display 213 may include an appended element in addition to the display panel in accordance with the kind of display panel. For example, the display 213 includes an LCD panel, a backlight unit for illuminating the LCD panel, a panel driving substrate for driving liquid crystal of the LCD panel, etc.

The loudspeaker 214 outputs a sound based on an audio signal. The loudspeaker 214 may include a unit loudspeaker provided corresponding to audio data of a certain audio channel, and may include a plurality of unit loudspeakers respectively corresponding to audio data of a plurality of audio channels.

The user input 215 transmits various preset control commands or information corresponding to a user's control or input to the controller 218. The user input 215 may be actualized in various forms according to methods of inputting the information, and the user input 215 may for example include a key provided at the outer side of the display apparatus 210, a touch screen provided on the display 213, a microphone receiving a user's speech, a camera capturing or detecting a user's gesture or the like, and the like user interface provided in the display apparatus 210. The remote controller may also be regarded as a kind of user interface. However, the remote controller is separated from the main body of the display apparatus 210, and thus the display apparatus 210 receives a control signal from the remote controller through a separate control signal receiver provided in the main body of the display apparatus 210.

The storage 216 is configured to store various pieces of data under control of the controller 218. The storage 216 is accessed by the controller 218 and performs reading, writing, modifying, deleting and updating the data. The storage 216 includes a flash memory in which data is retained regardless of whether the display apparatus 210 is powered on or off, a nonvolatile memory such as a hard-disc drive (HDD), a solid-state drive (SSD), etc., and a volatile memory such as a buffer, a random access memory (RAM), etc. in which data processed by the signal processor 212 or the controller 218 is temporarily loaded.

The sensor 217 detects optical characteristics in a surrounding environment, i.e. a use environment of the display apparatus 210. As an example of the optical characteristics in the surrounding environment, there are the brightness of the surrounding environment, and an optical color level of the surrounding environment. To this end, the sensor 217 includes one or more sensors such as an illumination sensor, or a red, green and blue (RGB) color sensor.

The controller 218 is actualized by a central processing unit (CPU), a microprocessor, etc. and performs control for operation of the elements of the display apparatus 210 such as the signal processor 212 and calculation for process of the signal processor 212. The controller 218 may be actualized as an element separated from the signal processor 212, or may be integrated into the SOC when the signal processor 212 is actualized by the SOC.

Below, the configuration of the external apparatus 220 will be described.

The external apparatus 220 includes a camera 221 capturing an image of the surrounding environment and generating a capture image, an external apparatus communicator 222 communicating with the display apparatus 210, an external apparatus processor 223 processing the image captured by the camera 221, an external apparatus display 224 which displays an image, and an external apparatus controller 225 controlling operation of the external apparatus 220.

The external apparatus 220 generates one or more capture images by the camera 221, and transmits the generated capture image directly to the display apparatus 210 through the external apparatus communicator 222 or processes the capture image through the external apparatus processor 223 and then transmit the processed capture image to the display apparatus 210 through the external apparatus communicator 222.

With this configuration, a method of displaying an image with less foreignness against the image of the installation space around the display apparatus 210 will be described.

Figure 3:
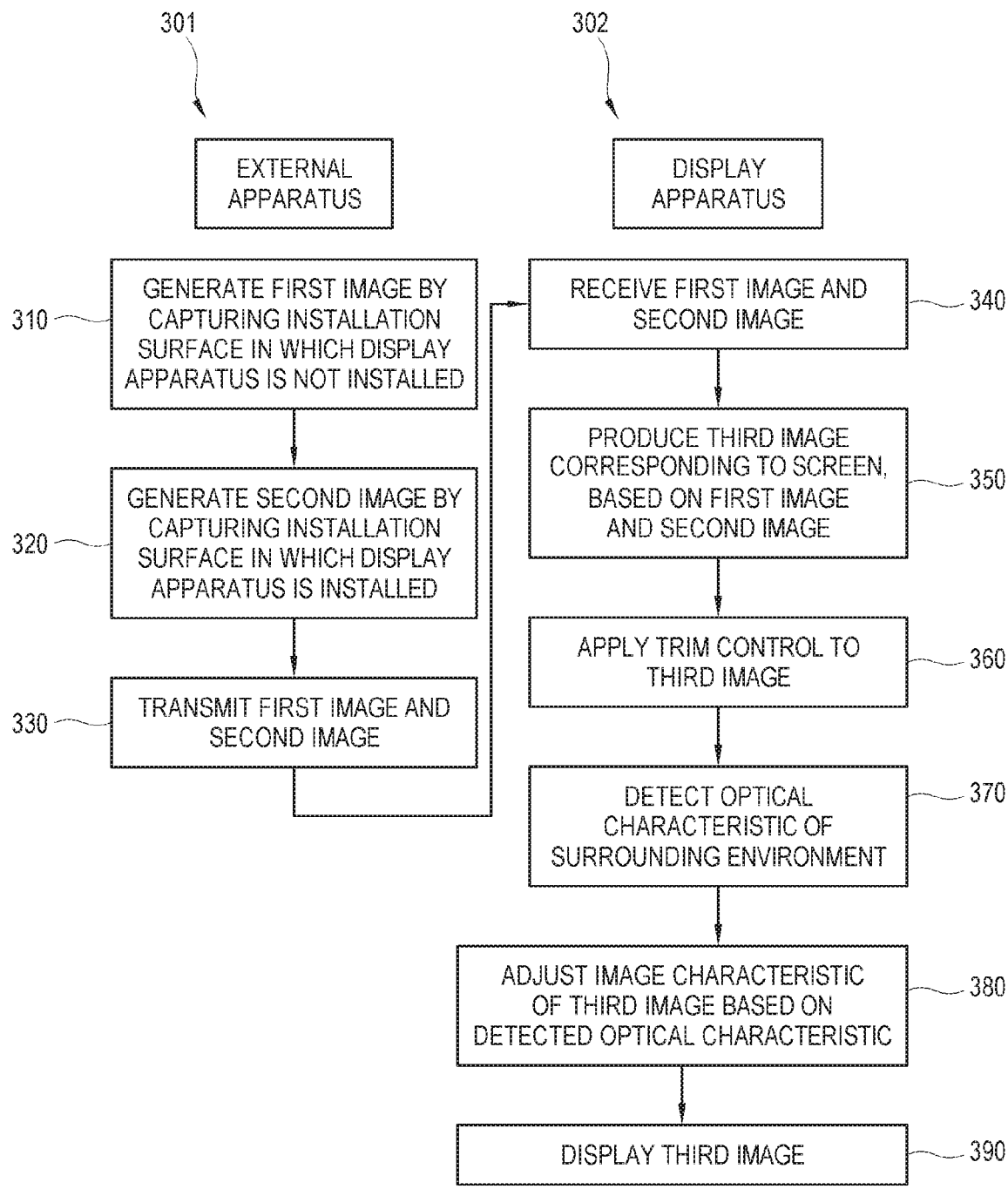
FIG. 3 is a flowchart showing operation of a display apparatus and an external apparatus in a system according to an embodiment of the disclosure.

FIG. 3 is a flowchart showing operation of a display apparatus and an external apparatus in a system according to an embodiment of the disclosure.

As shown in FIG. 3, the operation is divided into operation of an external apparatus 301 and operation of the display apparatus 302. On a process, the operation of the display apparatus 302 generally follows the operation of the external apparatus 301. Before performing the following operation, the external apparatus 301 and the display apparatus 302 respectively execute related applications, and implements the operation on the applications. The operation is performed when the display apparatus 302 is in at least a state of displaying a predetermined image, i.e. a standby mode or a normal mode.

At operation 310 the external apparatus 301 generates a first image by the camera. Here, the first image is obtained by capturing an image of the installation space where the display apparatus 302 is not installed. A user controls the camera of the external apparatus 301 to capture the image of the installation space so that the first image can include a region to be occupied by the whole outline of the display apparatus 302 to be installed in the future.

At operation 320 the external apparatus 301 generates a second image by the camera. The second image is obtained by capturing an image of the installation space where the display apparatus 302 is installed. That is, a user installs the display apparatus 302 in the installation space after the operation 310, and performs the operation 320. A user controls the camera of the external apparatus 301 to thereby capture an image of a region including the whole outline of the display apparatus 302.

At operation 330 the external apparatus 301 transmits the first image and the second image to the display apparatus 302.

The operation of the external apparatus 301 is completed as above, and is then followed by the operation of the display apparatus 302.

At operation 340 the display apparatus 302 receives the first image and the second image from the external apparatus 301. In this operation, the display apparatus 302 distinguishes between the first image excluding the display apparatus 302 and the second image including the display apparatus 302.

At operation 350 the display apparatus 302 produces a third image corresponding to the screen of the display apparatus 302, based on the first image and the second image. For example, the display apparatus 302 identifies the region corresponding to the screen of the display within the second image, and extracts an image corresponding to the identified region from the first image. The display apparatus 302 may employ various methods of identifying the region corresponding to the screen within the second image, and may for example identify a region, in which a preset solid color such as black is continued more largely than a preset area, as the screen within the second image.

At operation 360 the display apparatus 302 performs trim control with regard to the third image. Details of the trim control will be described later.

At operation 370 the display apparatus 302 detects the optical characteristics of the surrounding environment.

At operation 380 the display apparatus 302 adjusts image characteristics of the third image based on the detected optical characteristics. The optical characteristics of the surrounding environment and the image characteristics of the third image adjusted based on the optical characteristics will be described later.

At operation 390 the display apparatus 302 displays the third image.

Thus, the display apparatus 302 displays an image harmonizing with the installation space, thereby providing a use environment improved in aesthetic or interior decoration.

Below, the operation will be described in more detail.

FIG. 4 illustrates that an external apparatus according to an embodiment of the disclosure captures an image of an installation space in which a display apparatus is not installed.

As shown in FIG. 4, an external apparatus 410 uses a camera to capture a certain region of an installation space 420 where the display is not installed. Here, the region of the installation space 420 to be captured by the camera has an area covering at least the whole outline of the display apparatus to be installed in the installation space 420. In other words, when a user uses the external apparatus 410 to capture the corresponding region of the installation space 420, the user controls the external apparatus 410 leaving an enough distance between the installation space 420 and the external apparatus 410 so that a captured first image 430 can involve the region corresponding to the whole outline of the display apparatus to be installed in the future.

The external apparatus 410 may currently display the outline of the installation space 420 to be captured by the camera, on its own display 411. A user makes the outline of the installation space 420 be captured while viewing the image displayed on the display 411. The external apparatus 410 generates the first image 430 as captured by the camera. The first image, the second image and the third image to be described later are equivalent to those described above.

After the captured first image is generated by the external apparatus 410, a user installs the display apparatus with respect to the installation space 420.

FIG. 5 illustrates that an external apparatus according to an embodiment of the disclosure captures an installation space in which a display apparatus is installed.

As shown in FIG. 5, an external apparatus 510 captures an outline of a display apparatus 530 and an installation space 520 in a state that the display apparatus 530 is installed in the installation space 520. When the external apparatus 510 generates a second image 540 by capturing the outline of the display apparatus 530 and the installation space 520, while making the whole outline of the display apparatus 530 be included within the second image 540. The external apparatus 510 captures and generates the second image 540 after capturing and generating the first image and then installing the display apparatus 530 with respect to the installation space 520.

Further, a distance between the external apparatus 510 and the installation space 520 at capturing the second image 540 and a distance between the external apparatus and the installation space at capturing the first image may be as equal as possible. This contributes to improvement in accuracy of the third image by enhancing matching between the first image and the second image 540 in terms of producing the third image based on comparison between the first image and the second image 540 in the future. Of course, even though the first image and the second image 540 are not captured at perfectly the same distance, a preset correction process may be applied to make the outline of the installation space in the first image match the outline of the installation space in the second image 540.

When the first image and the second image are generated as above, the external apparatus 510 transmits the first image and the second image to the display apparatus.

Figure 6:
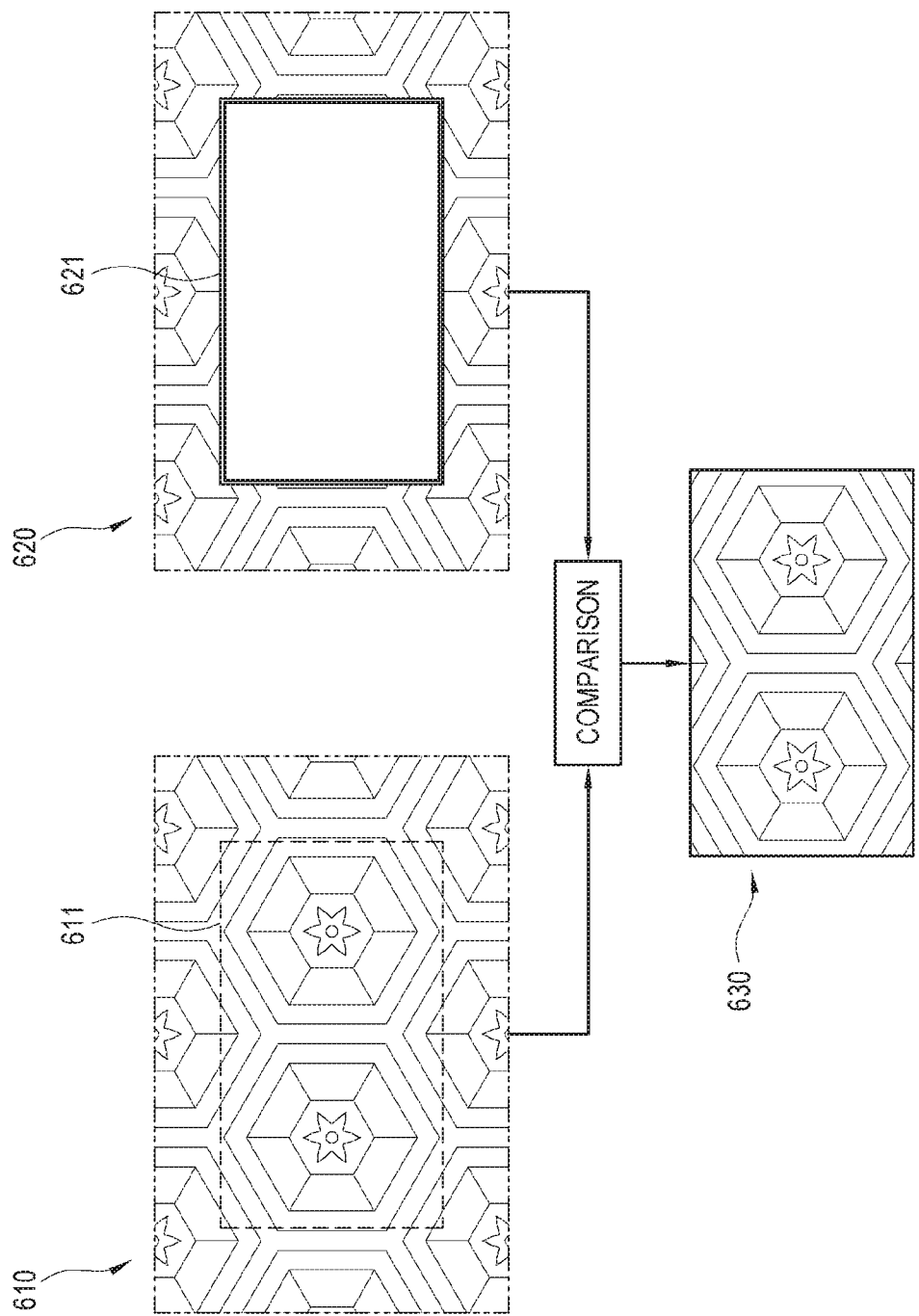
FIG. 6 illustrates that a display apparatus according to an embodiment of the disclosure produces a third image based on a first image and a second image.

FIG. 6 illustrates that a display apparatus according to an embodiment of the disclosure produces a third image based on a first image and a second image.

As shown in FIG. 6, a display apparatus receives a first image 610 and a second image 620 from an external apparatus, compares the first image 610 and the second image 620, and produces a third image 630 of a region corresponding to a screen 621 of the display apparatus in accordance with comparison results.

The display apparatus identifies a region corresponding to the screen 621 of the display apparatus within the second image 620, and identifies a region 611 of the first image 610 corresponding to the position of the identified screen 621. The first image 610 includes only the outline of the installation space without including the display apparatus, and the second image 620 includes the display apparatus supported on the installation space. For example, the display apparatus identifies the region 611 of the first image 610 corresponding to the screen 621 of the display apparatus in a state that the first image 610 and the second image 620 are overlapped, and cuts the identified region 611. The region 611 cut from the first image 610 refers to an image which is not shown in the second image 620 due to the screen 621 of the display apparatus.

Thus, the display apparatus produces the image of the corresponding region 611 as the third image 630.

Figure 7:
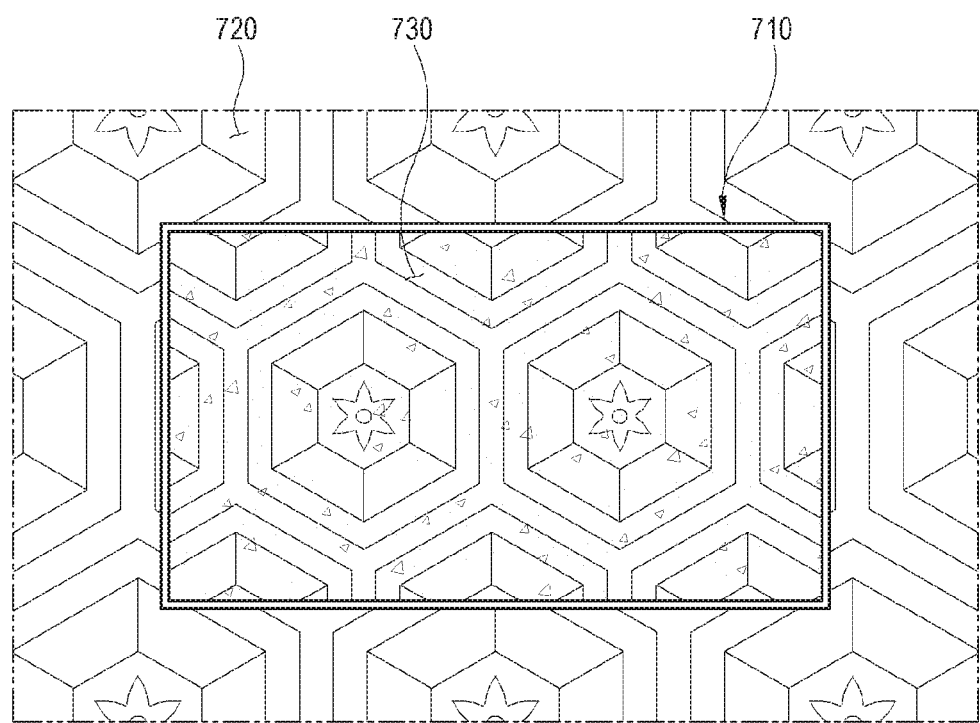
FIG. 7 illustrates that a display apparatus according to an embodiment of the disclosure displays a third image without applying trim control to the third image.

FIG. 7 illustrates that a display apparatus according to an embodiment of the disclosure displays a third image without applying trim control to the third image.

As shown in FIG. 7, a display apparatus 710 may directly display a third image 730 produced by the foregoing method. However, when the display apparatus 710 directly displays the third image 730 without any correction, the displayed third image 730 may not harmonize with an installation space 720 in two aspects.

In one aspect, mismatching may be made between the third image 730 and the image of the installation space 720. As described above, the third image 730 is produced by comparing the first image obtained by capturing the installation space, in which the display apparatus is not installed, with the second image obtained by capturing the installation space, in which the display apparatus is installed, and cutting the region of the first image corresponding to the screen of the display apparatus in accordance with comparison results. However, when the external apparatus captures each of the first image and the second image, the distance between the external apparatus and the installation space 720 may be varied a little. In this case, the first image may be different in size from the second image, and therefore the edges of the third image 730 cut from the first image may misaligned with the edges of the installation space 720.

In the other aspect, the image characteristics of the third image 730 may mismatched with the image of the installation space 720. Among many image characteristics of the third image 730, brightness and a color level have to be taken into account. While the brightness and the color level of the third image 730 are based on the display apparatus 710, the image of the installation space 720 is based on the optical characteristics around the display apparatus 710. For example, when a user recognizes the white of the installation space 720 under conditions that the light of the surrounding environment is white and has a daylight color, it looks like a different color even though the color is not changed. Therefore, even though the third image 730 matches the installation space 720, a user may recognize that the third image 730 mismatches the installation space 720 when the third image 730 is different in brightness or color level from the installation space 720.

Thus, after the third image 730 is produced, the display apparatus 710 performs trim control operation for correcting the third image 730 so that the outline of the third image 730 can match the outline of the installation space 720, and image characteristic adjusting operation for adjusting the image characteristics of the third image 730 to correspond to the installation space 720, thereby displaying the third image 730. The trim control operation and the image characteristic adjusting operation may be performed together, and the operation that is not needed for the third image 730 may not be performed.

Figure 8:
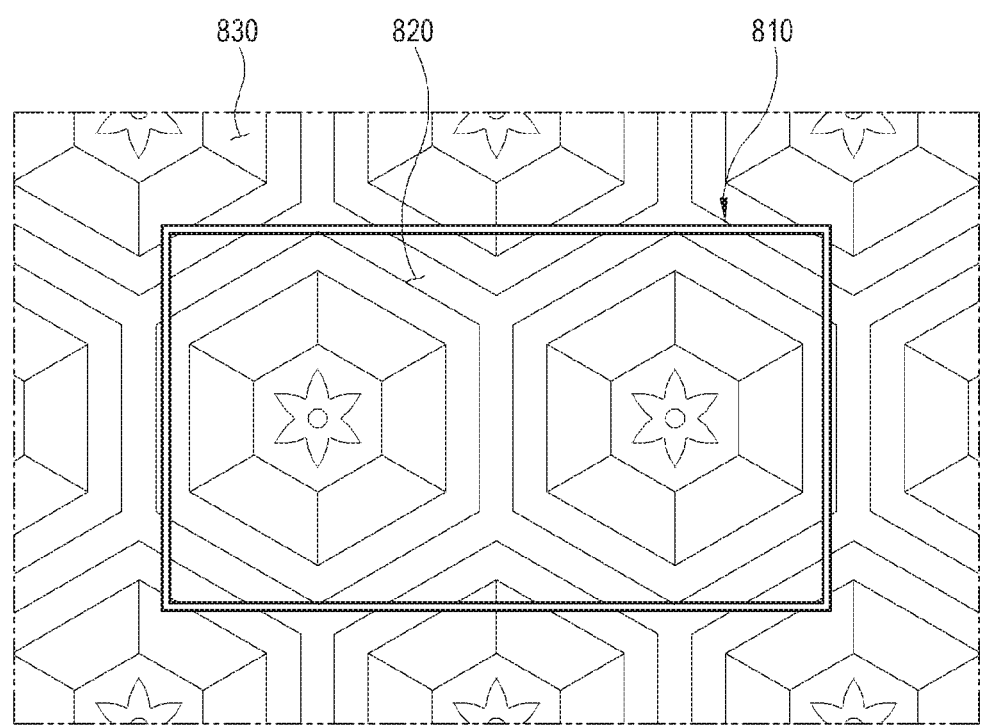
FIG. 8 illustrates that a display apparatus according to an embodiment of the disclosure displays a corrected third image.

FIG. 8 illustrates that a display apparatus according to an embodiment of the disclosure displays a corrected third image.

As shown in FIG. 8, a display apparatus 810 displays a third image 820 corrected by the trim control and the image characteristic adjustment. The displayed third image 820 generally matches an image of an installation space 830 around the display apparatus 810, and has a substantially similar brightness and color level. Therefore, it looks for a user as if the installation space 830 is continued. According to an embodiment of the disclosure, the display apparatus 810 may provide use environment improved in interior decoration to a user.

The third image 820 is a still image and is typically displayed consuming less power than a moving image, so that the display apparatus 810 can display the third image 820 even in the standby mode. Of course, to prevent a worrying burn-in phenomenon when the third image 820 is displayed on the display apparatus 810 for a long time, the display apparatus 810 may perform a pixel shift every preset cycle while displaying the third image 820.

Figure 9:
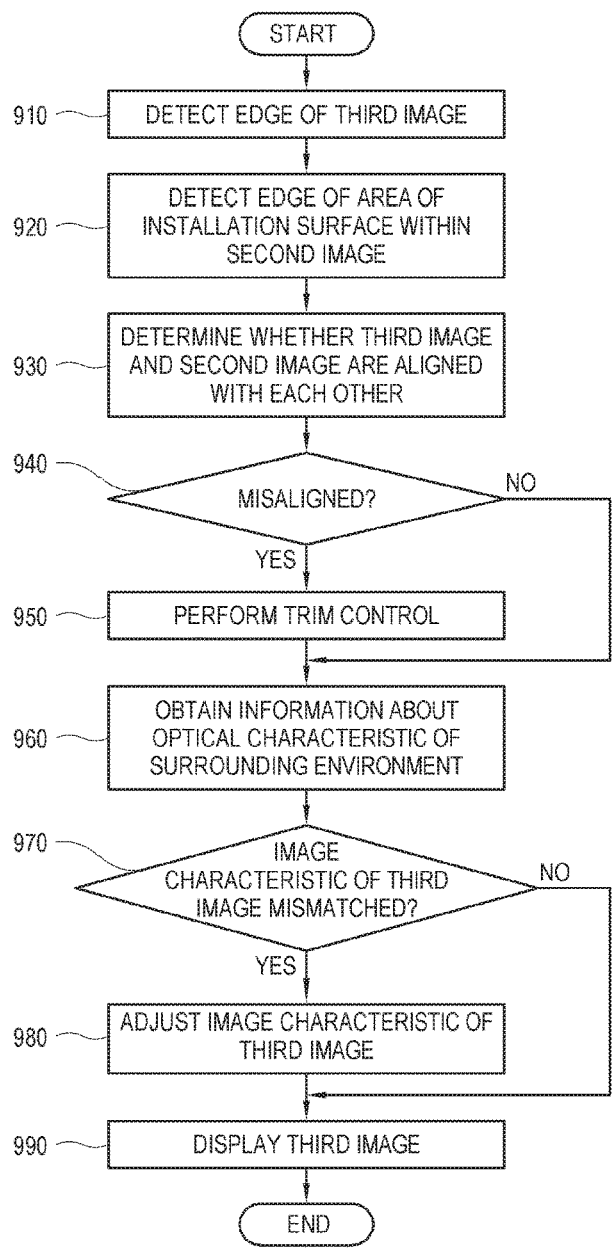
FIG. 9 is a flowchart showing operation of correcting a third image in a display apparatus according to an embodiment of the disclosure.

FIG. 9 is a flowchart showing operation of correcting a third image in a display apparatus according to an embodiment of the disclosure.

As shown in FIG. 9, at operation 910 the display apparatus detects the edge of the third image. To detect the edge, various algorithms using a mask may be used.

At operation 920 the display apparatus detects the edge of the region of the installation space within the second image.

At operation 930 the display apparatus applies the third image to the second image and compares the edges in matching between them. In other words, the display apparatus disposes the third image in the region corresponding to the screen of the display apparatus within the second image, and identifies whether the edge of the second image matches the edge of the third image.

At operation 940 the display apparatus identifies whether there is mismatching between the edges. There are two types of the mismatching: one type is that the edge of the second image is different in scale from the edge of the third image, and the other type is that the edge of the second image has the same scale as but is misaligned with the edge of the third image.

When it is determined that the mismatching, at operation 950 the display apparatus performs the trim control the trim control to correct the mismatching. The trim control includes zoom control and panning. The display apparatus zooms in or out the third image to correct the scale when the scale is mismatched, and performs panning to adjust relative positions of the third image with regard to the second image when the edges are misaligned.

At operation 960 the display apparatus obtains information about the optical characteristics of the surrounding environment. The information about the optical characteristics may include a brightness level received from an illumination sensor, or an RGB color level received from an RGB color sensor.

At operation 970 the display apparatus identifies whether the image characteristics of the third image are mismatched with the optical characteristics of the surrounding environment.

When it is identified that the image characteristics of the third image are mismatched with the optical characteristics of the surrounding environment, at operation 980 the display apparatus adjusts the image characteristics of the third image to match the optical characteristics of the surrounding environment. For example, the display apparatus adjusts the brightness of the third image to match the brightness of the surrounding environment, or adjusts a white balance level of the third image to match the color level of the surrounding environment.

For example, when the light of the surrounding environment is based on a red-light source, a user recognizes white as red. Thus, the display apparatus decreases a GB level among the RGB levels of the third image to relatively increase an R level, thereby having an effect on making white look like red.

At operation 990 the display apparatus displays a corrected third image.

Thus, the display apparatus may display the third image to harmonize with the installation space.

In the foregoing embodiment, the external apparatus directly transmits the first image and the second image to the display apparatus, and the display apparatus generates the third image based on the first image and the second image. However, the third image may be generated by the external apparatus as well as the display apparatus, and descriptions will be made in this regard.

Figure 10:
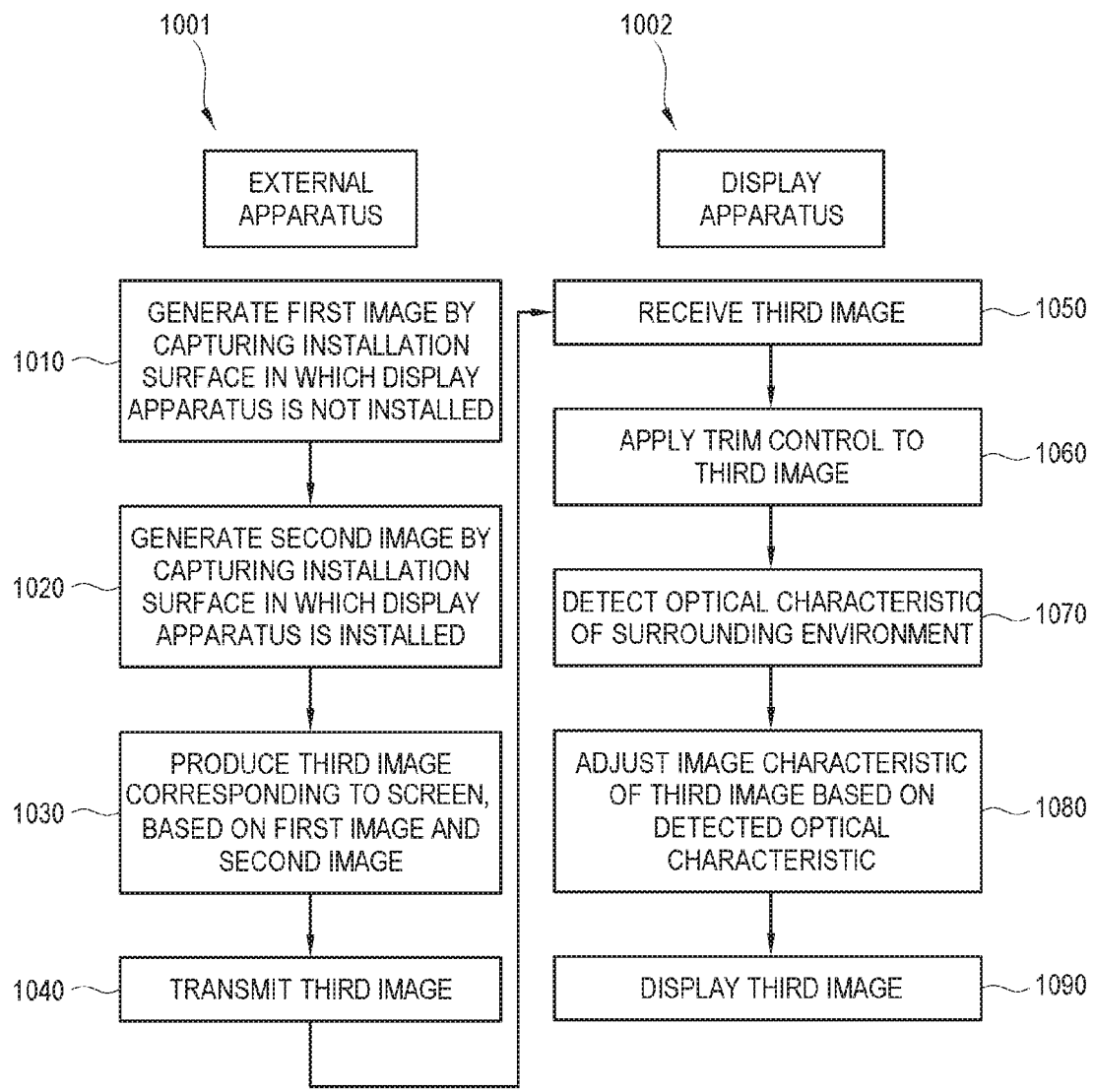
FIG. 10 is a flowchart showing operation of a display apparatus and an external apparatus in a system according to an embodiment of the disclosure.

FIG. 10 is a flowchart showing operation of a display apparatus and an external apparatus in a system according to an embodiment of the disclosure.

As shown in FIG. 10, at operation 1010 an external apparatus 1001 generates a first image by capturing an installation space, in which the display apparatus 1002 is not installed, through a camera. Here, the first image, the second image, and the third image are equivalent to those described above.

At operation 1020 the external apparatus 1001 generates a second image by capturing the installation space, in which the display apparatus 1002 is installed, by the camera.

At operation 1030 the display apparatus 1002 produces a third image corresponding to the screen of the display apparatus 1002, based on the first image and the second image. The method of producing the third image is based on the same principle as described in the foregoing embodiments.

At operation 1040 the external apparatus 1001 transmits the produced third image to the display apparatus 1002.

The operation of the external apparatus 1001 is over now, and followed by the operation of the display apparatus 1002.

At operation 1050 the display apparatus 1002 receives the third image from the external apparatus 1001.

At operation 1060 the display apparatus 1002 applies the trim control to the third image.

At operation 1070 the display apparatus 1002 detects the optical characteristics of the surrounding environment.

At operation 1080 the display apparatus 1002 adjusts the image characteristics of the third image based on the detected optical characteristics.

At operation 1090 the display apparatus 1002 displays the third image.

In this embodiment, the external apparatus 1001 produces and transmits the third image to the display apparatus 1002, and the display apparatus 1002 performs only correction with respect to the third image and displays the third image. Like this, the third image may be produced by the external apparatus 1001 or the display apparatus 1002 in accordance with design.

Meanwhile, when a user captures the first image and the second image through the external apparatus, a distance between the external apparatus and the installation space at capturing the first image and a distance between the external apparatus and the installation space at capturing the second image may be as equal as possible. However, it is actually difficult for a user to capture the first image and the second image while making the distances equal, and therefore the external apparatus may support a function of helping a user make the distances equal.

Figure 11:
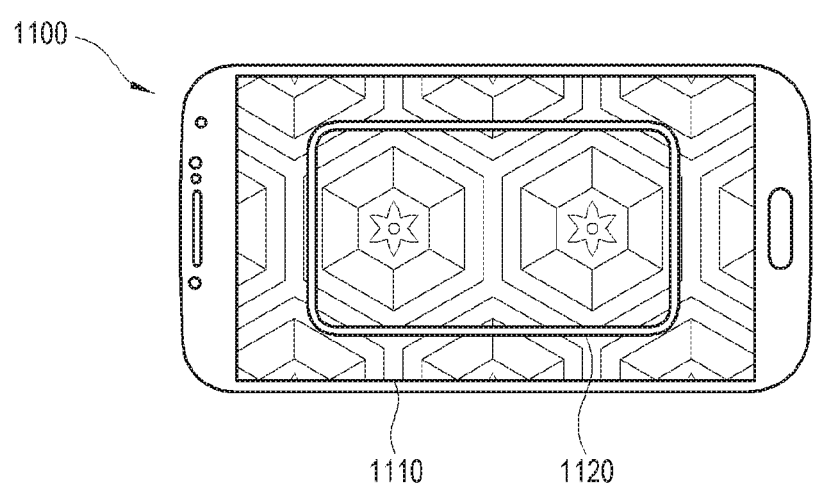
FIG. 11 illustrates that an external apparatus according to an embodiment of the disclosure displays a guide image for guiding a capture position of a camera.

FIG. 11 illustrates that an external apparatus according to an embodiment of the disclosure displays a guide image for guiding a capture position of a camera.

As shown in FIG. 11, an external apparatus 1100 may execute a capture application to generate an image of the installation space captured by a camera. When the capture application is executed, the external apparatus 1100 activates the camera and displays a guide image 1120 having a quadrangular frame on a display 1110.

The guide image 1120 provides a guide for a virtual position at which the display apparatus will be installed on the installation space. Further, the guide image 1120 guides a preset proper distance between the external apparatus 1100 and the installation space to be kept while a user holds the external apparatus 1100 to capture the installation space. The proper distance is previously set.

For example, the external apparatus 1100 does not display the guide image 1120 while a user does not keep the proper distance, but displays the guide image 1120 when it is detected that the user keeps the proper distance. Alternatively, the external apparatus 1100 may display the guide image 1120 blurredly or translucently while a user does not keep the proper distance, and display the guide image 1120 clearly or opaquely when it is detected that the user keeps the proper distance. Thus, a user may recognize that the proper distance is kept between the external apparatus 1100 and the installation space.

Here, the external apparatus 1100 may include a sensor for detecting a distance between the external apparatus 1100 and the installation space.

The external apparatus 1100 generates the first image by capturing the installation space while the guide image 1120 is displayed.

Figure 12:
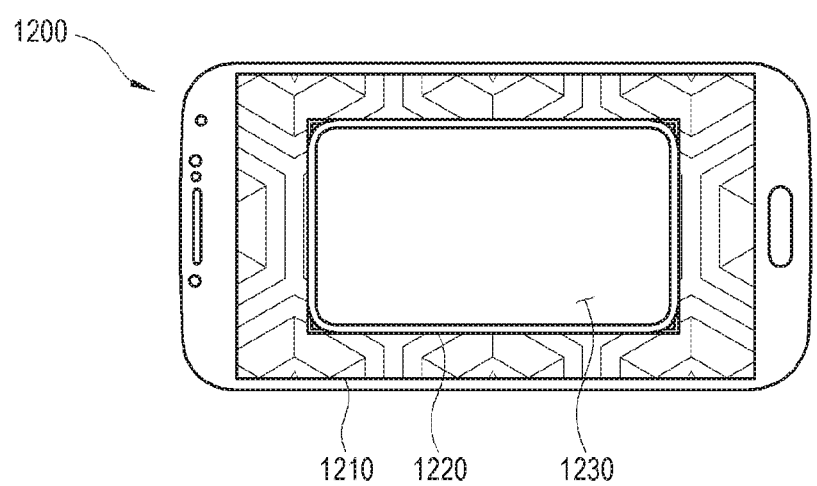
FIG. 12 illustrates that an external apparatus according to an embodiment of the disclosure captures a second image while a guide image is displayed.

FIG. 12 illustrates that an external apparatus according to an embodiment of the disclosure captures a second image while a guide image is displayed.

As shown in FIG. 12, a user captures an installation space, in which a display apparatus is installed, through an external apparatus 1200. In this case, the external apparatus 1200 displays a guide image 1220 on a display 1210. A user adjusts a distance between the external apparatus 1200 and the installation space so that a screen 1230 of the display apparatus can be positioned within the guide image 1220, and captures the installation space in this state, so that a second image can be generated.

Because the guide image 1220 has a quadrangular frame, a user moves the external apparatus 1200 so that the frame of the guide image 1220 can be captured being aligned with the bezel of the display apparatus. Thus, the distance between the external apparatus 1200 and the installation space when capturing the first image and the distance between the external apparatus 1200 and the installation space when capturing the second image may be substantially equal within an allowable error range.

Because the size of the guide image 1220 corresponds to the size of the screen of the display apparatus, the external apparatus 1200 may provide the guide image 1220 of various sizes corresponding to the model of the display apparatus or the screen size of the display apparatus. When a user inputs information about the model name of the display apparatus or the size of the screen to the external apparatus 1200, the external apparatus 1200 retrieves the guide image 1220 corresponding to the input information from a previously stored database (DB) or a DB of a server accessible by the external apparatus 1200, and displays the guide image 1200. Alternatively, the external apparatus 1200 may allow a user to voluntarily zoom in or out the guide image 1220 and adjust the size of the guide image 1220.

Thus, the external apparatus 1200 is provided to capture images corresponding to various kinds of display apparatus.

In the foregoing embodiments, the first image obtained by capturing the installation space in which the display apparatus is not installed is compared with the second image obtained by capturing the installation space in which the display apparatus is installed, thereby producing the third image corresponding to the screen of the display apparatus. Alternatively, the third image may be produced when only the second image is present without the first image.

Figure 13:
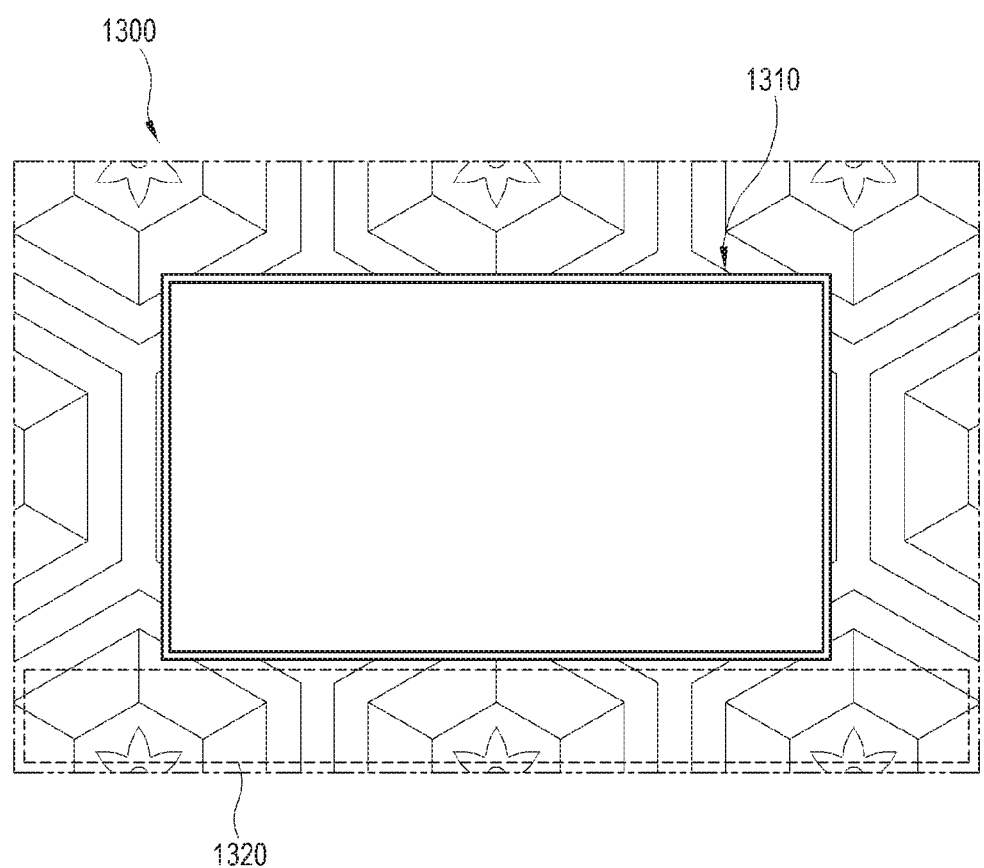
FIG. 13 illustrates a second image captured by an external apparatus according to an embodiment of the disclosure.

FIG. 13 illustrates a second image captured by an external apparatus according to an embodiment of the disclosure.

As shown in FIG. 13, the external apparatus may generate a second image 1300 by capturing an installation space in which a display apparatus is installed. Here, the external apparatus may transit only the second image 1300 to the display apparatus, without the first image obtained by capturing the installation space in which the display apparatus is not installed.

The display apparatus produces the third image corresponding to a first region 1310 corresponding to the screen of the display apparatus from the second image 1300 received from the external apparatus. Specifically, the display apparatus identifies not the display apparatus but a second region 1320 corresponding to the installation space within the second image 1300. The position or area of the second region 1320 may be varied depending on design within the second image 1300. In the accompanying drawing, the second region 1320 is a partial region under the first region 1310 within the second image 1300, but not limited thereto. Alternatively, the rest of the second image 1300 except the first region 1310 may be set as the second region 1320.

The display apparatus analyzes the image of the second region 1320 and estimates the image of the first region 1310 corresponding to the screen of the display apparatus within the second image 1300 in accordance with analysis results. The estimation may be achieved by various methods. When the installation space is covered with wallpaper in which a certain unit image pattern recurs, the display apparatus extracts the unit image pattern of the installation space from the second region 1320, and fills the extracted unit image pattern inn the first region 1310, thereby producing the third image. Specifically, the display apparatus identifies the edge of the second region 1320 and the brightness and color level according to the pixels, thereby identifying the unit image pattern.

Alternatively, a DB in which various unit image patterns of the installation space are registered may be used. When it is difficult to derive the whole unit image pattern of the installation space from the second region 1320, the display apparatus derives a part of the unit image pattern displayed on the second region 1320 and retrieves the unit image pattern corresponding to the derived pattern part from the DB, thereby obtaining the whole unit image pattern. The display apparatus applies the obtained unit image pattern to the first region 1310, thereby finally producing the third image.

The analysis of the unit image pattern and the retrieval of the DB may be performed by the display apparatus or the external apparatus. However, the analysis of the unit image pattern and the retrieval of the DB may be performed by a server communicating with the display apparatus or the external apparatus, while taking a system load into account. In this case, the display apparatus or the external apparatus transmits the second image 1300 to the server, and the server may analyze the second image 1300 and produce the third image, thereby transmitting the third image to the display apparatus or the external apparatus.

Figure 14:
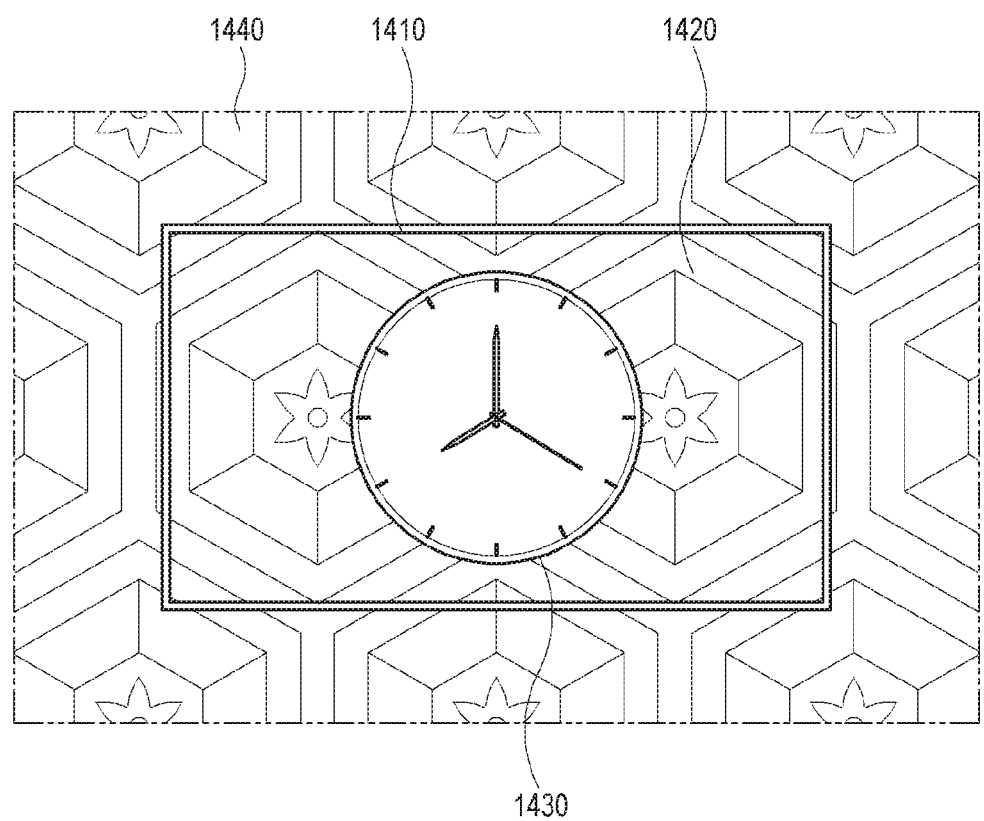
FIG. 14 illustrates that a display apparatus according to an embodiment of the disclosure displays a separate user interface (UI) on a third image.

FIG. 14 illustrates that a display apparatus according to an embodiment of the disclosure displays a separate user interface (UI) on a third image.

As shown in FIG. 14, the display apparatus 1410 may display a third image 1420 harmonizing with an installation space 1440. Such a method of displaying the third image 1420 is the same as those described in the foregoing embodiment.

The display apparatus 1410 may additionally display a separate UI 1430 on the third image 1420, while displaying the third image 1420. There are no limits to the kind of UI 1430, and the UI 1430 may for example be an image of a watch or a picture frame, etc. The display apparatus 1410 may display the UI 1430 in a picture in picture (PIP) or popup form. Thus, the display apparatus 1410 may look for a user as if a clock is mounted to a wall.

However, the third image 1420 is displayed considering a user's aesthetic point of view. When a user is absent, the display apparatus 1410 does not have to display the third image 1420. Thus, the display apparatus 1410 may selectively display the third image 1420 or the UI 1430 in response to presence of a user. For example, the display apparatus 1410 may use a sensor such as a motion sensor, an ultrasonic sensor, a photosensor, etc. to identify whether a user is present in the surrounding environment.

While displaying the third image 1420, the display apparatus 1410 does not display the UI 1430 when it is sensed that a user is absent, and displays the UI 1430 when it is sensed that a user is present. Alternatively, the display apparatus 1410 may not display the third image 1420 and the UI 1430 when it is sensed that a user is absent, and may display the third image 1420 and the UI 1430 when it is sensed that a user is present. Alternatively, the display apparatus 1410 may show a typical black screen without displaying the third image 1420 when it is sensed that a user is absent, and may display the third image 1420 when it is sensed that a user is present.

Thus, the display apparatus 1410 may display the third image 1420 and the UI 1430 in various ways.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a non-volatile or volatile storage such as a ROM or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

The invention claimed is:

1. A display apparatus comprising:
a display; and
a processor configured to:
obtain a first image and a second image, wherein the first image does not include an object corresponding to the display apparatus and the second image includes the object corresponding to the display apparatus,
identify a region corresponding to the display within the first image based on the object corresponding to the display apparatus of the second image,
obtain a third image corresponding to the identified region from the first image by cutting the identified region from the first image, and
process the third image to be displayed on the display.

2. The display apparatus according to claim 1, wherein the processor is further configured to identify the second image obtained by capturing an installation space in which the display apparatus is installed, and the first image obtained by capturing the installation space in which the display apparatus is not installed.

3. The display apparatus according to claim 1, wherein the processor is further configured to identify a region, in which an area of a solid color is larger than a preset area, within the second image as the region corresponding to the display.

4. The display apparatus according to claim 1, wherein the processor is further configured to adjust at least one of a display scale and a display position of the third image to be displayed.

5. The display apparatus according to claim 1, further comprising a first sensor configured to detect an optical characteristic of a surrounding environment around the display apparatus,
wherein the processor is further configured to adjusts an image characteristic of the third image based on the optical characteristic detected by the first sensor.

6. The display apparatus according to claim 5, wherein:
the first sensor comprises an illumination sensor, and
the processor is further configured to adjust a brightness of the third image based on a brightness detected by the illumination sensor.

7. The display apparatus according to claim 5, wherein:
the first sensor comprises a color level sensor, and
the processor is further configured to adjust a white balance level of the third image based on a color level of the surrounding environment detected by the color level sensor.

8. The display apparatus according to claim 1, further comprising a second sensor configured to detect whether a user is absent or present,
wherein the processor is further configured to display the third image on the display based on a detected presence of the user, and does not display the third image on the display based on a detected absence of the user.

9. The display apparatus according to claim 1, wherein the processor is further configured to display the third image while the display apparatus is in a standby mode.

10. A non-transitory, nonvolatile recording medium storing a program code of a method executable by a processor of a display apparatus, the method comprising:
obtaining a first image and a second image, wherein the first image does not include an object corresponding to the display apparatus and the second image includes the object corresponding to the display apparatus;
identifying a region corresponding to a display of the display apparatus within the first image based on the object corresponding to the display apparatus of the second image;
obtaining a third image corresponding to the identified region from the first image by cutting the identified region from the first image; and
displaying the third image on the display.

11. The non-transitory, nonvolatile recording medium according to claim 10, further comprising identifying the second image obtained by capturing an installation space in which the display apparatus is installed, and the first image obtained by capturing the installation space in which the display apparatus is not installed.

12. The non-transitory, nonvolatile recording medium according to claim 10, wherein the identifying comprises identifying a region, in which an area of a solid color is larger than a preset area, within the second image as the region corresponding to the display.

13. The non-transitory, nonvolatile recording medium according to claim 10, wherein the displaying comprises adjusting at least one of a display scale and a display position of the third image to be displayed.

14. The display apparatus according to claim 1, wherein the processor is further configured to adjust the third image such that an outline of the third image matches an outline of an installation space where the display apparatus is installed.

* * * * *